United States Patent [19]

Sartori et al.

[11] Patent Number: 5,204,434
[45] Date of Patent: Apr. 20, 1993

[54] POLYCARBOSILANES AND PROCESS FOR PREPARING THEM

[75] Inventors: Peter Sartori, Rheinberg; Wolfgang Habel, Duesseldorf; Heinz-Peter Judenau, Krefeld, all of Fed. Rep. of Germany

[73] Assignee: Kali-Chemie AG, Hanover, Fed. Rep. of Germany

[21] Appl. No.: 709,571

[22] Filed: Jun. 4, 1991

[30] Foreign Application Priority Data

Jun. 8, 1990 [DE] Fed. Rep. of Germany ....... 4018374

[51] Int. Cl.$^5$ ............................................. C08G 77/106
[52] U.S. Cl. ........................................ 528/14; 528/16; 528/17; 528/18; 528/19; 528/23; 528/25; 528/33; 528/21; 528/10; 525/474; 525/475
[58] Field of Search ................ 525/474, 475; 528/25, 528/33, 10, 14, 16, 17, 21, 23, 19, 18

[56] References Cited

U.S. PATENT DOCUMENTS

| | | | |
|---|---|---|---|
| 4,761,458 | 8/1988 | Burns et al. | 525/474 |
| 4,777,234 | 10/1988 | Litt et al. | 528/37 |
| 5,087,685 | 2/1992 | Sartori et al. | 528/25 |
| 5,132,375 | 7/1992 | Sartori et al. | 525/474 |

FOREIGN PATENT DOCUMENTS

| | | |
|---|---|---|
| 400465 | 12/1990 | European Pat. Off. . |
| 3616378 | 11/1987 | Fed. Rep. of Germany . |
| 3634281 | 4/1988 | Fed. Rep. of Germany . |
| 896301 | 5/1962 | United Kingdom . |

OTHER PUBLICATIONS

Morrison and Boyd, Organic Chemistry, 3rd ed., pp. 80 to 83 (1973).
Chemical Abstracts 88(20):137320r (Podol'skii et al.).
Chemical Abstracts 81(12):64265v (Podol'skii et al.).
Chemical Abstracts 110(25):231692h (Bacque et al.).

*Primary Examiner*—Melvyn I. Marquis
*Attorney, Agent, or Firm*—Foley & Lardner

[57] ABSTRACT

Polycarbosilanes having Si units which are linked by phenyl-substituted methylene bridges or by partially or completely fluorinated hydrocarbon bridges. These polycarbosilanes are obtained by a Grignard polycondensation reaction. If phenyl substituents are present on the silicon atoms of the polycarbosilanes, they may also optionally be exchanged for halogen atoms in additional halogenating reactions, so that polycarbosilanes can be prepared which are both fluorinated on the hydrocarbon bridges and halogenated (particularly fluorinated) on the silicon atoms.

18 Claims, No Drawings

POLYCARBOSILANES AND PROCESS FOR PREPARING THEM

BACKGROUND OF THE INVENTION

The invention relates to novel polycarbosilanes and to processes for preparing them.

Polycarbosilanes are polymers having a backbone structure made from the elements carbon and silicon, in which in general Si groups and hydrocarbon groups are present alternately. The backbone structure of polycarbosilanes of this type consists, for example, of repeating structural units corresponding to the formula

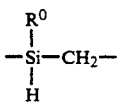

wherein $R^0$ represents, for example, a hydrocarbon substituent. According to known preparation processes polycarbosilanes of this type are obtained by thermally decomposing monosilanes, such as for example tetramethylsilane, trimethylchlorosilane, dimethyldichlorosilane or methyltrichlorosilane, to convert them into mixtures of various polycarbosilanes. A further known process for preparing polycarbosilanes of this type starts from polysilanes in which at least one of the two substituents on the silicon atom is a methyl group. These polysilanes are converted to the polycarbosilane by pyrolysis at temperatures of 350° to 450° C. During the pyrolysis or thermal conversion, methylene groups are formed from some of the methyl substituents and are inserted between adjacent Si atoms of the polysilane, and a hydrogen atom remains on the silicon atom. Pyrolyses of this type proceed through a free-radical reaction mechanism.

Polycarbosilanes, in which the Si atoms are linked by bridges of organic aromatic groups, or preferably heteroaromatic groups, such as pyrrol-2,5-diyl or thiophen-2,5-diyl, are known from German published application No. 36 34 281. The object of this application is to prepare conductive polysilanes by additional chemical or electrochemical doping.

It is known from British patent specification No. GB 896,301 to convert monomeric diaryldihalosilanes and p-phenylene dimagnesium bromide via a Grignard reaction to polycarbosilanes in which the Si atoms are linked by phenylene bridges. Thermoplastic, heat-curable resins are obtained.

It is known to prepare copolymers made from silane monomer units and olefin units in the presence of potassium in tetrahydrofuran in accordance with Schilling and Williams (Schilling, C. L., Jr.; Williams, T. C. (Union Carbide Corp., Tarrytown, N.Y., USA). Report 1983, TR-83-2; Order No. AD-A141558, 15 pp. (Eng). Avail. NTIS. From Gov. Rep. Announce. Index (U.S.) 1984, 84(18), 48; see also Chemical Abstracts 101:196821q). Methyltrichlorosilane, dimethyldichlorosilane or methyldichlorohydrosilane are reacted as silane monomers with styrene or isoprene, wherein in the case of styrene, the Si units are linked by phenyl-substituted ethylene units. In the case of isoprene, the Si units are linked by the corresponding methyl-substituted $C_4$-alkylene chain which has a further double bond. In two additional examples, isoprene is reacted with methylchloro-methyldichlorosilane or with a mixture of vinylmethyldichlorosilane and trimethylchlorosilane.

Halogenated polycarbosilanes are known from U.S. Pat. No. 4,761,458. These halogenated polycarbosilanes are prepared from polycarbosilanes which carry at least 0.1 wt % of SiH groups and which are converted to chlorinated or brominated polycarbosilanes by reacting with chlorinating or brominating reagents in a free-radical reaction, whereby SiCl or SiBr groups are formed from the SiH groups. As educts for the halogenation reaction, U.S. Pat. No. 4,761,458 uses conventional polycarbosilanes of the type described above which are substituted by lower alkyl groups and are known from the state of the art. These were prepared by pyrolysis of, for example, polydimethylsilane $(-(CH_3)_2Si-)_n$.

Furthermore, prepolymers made from ceramic-forming elements for the preparation of ceramic polymer materials are known from German published application no. DE 36 16 378. In these compounds easily cleavable elements are partly replaced by elements which are difficult to cleave, such as fluorine or completely fluorinated hydrocarbon groups. Hydrogen is mentioned there as an easily cleavable element. The exemplary embodiment of the published German application also starts from a conventional polycarbosilane of the type described above, which is known from the state of the art and was prepared by pyrolysis of polydimethylsilane $(-(CH_3)_2Si-)_n$. Fluorine is introduced into this polycarbosilane by electrofluorination using tetraethylammonium fluoride or by direct (free radical) fluorination using elemental fluorine. In this case, in addition to the conversion of SiH groups into SiF groups, fluorine atoms are also introduced into the methyl substituents on the silicon atoms and into the methylene bridges of the Si—$CH_2$—Si backbone of the polycarbosilane.

Indeed, a number of polycarbosilanes and also some halogenated polycarbosilanes, and processes for their preparation, are already known in the state of the art. Yet certain types of polycarbosilane could not be prepared in the prior art. For example, it has not heretofore been possible to prepare polycarbosilanes in which the Si atoms are linked by phenyl-substituted methylene bridges or by defined aliphatic hydrocarbon bridges partially or completely substituted by fluorine. Likewise, it has not heretofore been possible to prepare polycarbosilanes which have a defined structure and carry fluorine substituents on the Si atoms, and in which the Si atoms carry linking, aliphatic hydrocarbon bridges.

Furthermore, the polycarbosilanes known from the state of the art, in particular those obtained pyrolytically, and halogenated polycarbosilanes prepared therefrom by free radical halogenation, are subject to a series of disadvantages with regard to the properties of the products and the processes by which they are prepared. The disadvantageous properties of these known polycarbosilanes are attributable to the unfavorable effects of their pyrolytic preparation, by means of which the basic structure and the maximum attainable degree of purity for the polycarbosilanes and also the halogenated derivative products is already essentially predetermined. Hence the known halogenated and non-halogenated polycarbosilanes are non-uniform products which have an irregular SiC backbone and are accompanied by more or less volatile decomposition products, the identity of which depends on the preparation method. However, additional measures for limiting the products to a product spectrum more favorable for the intended further use (for example purification and/or separation by fractional crystallization or fractional distillation) are work, energy and cost intensive. The ease with which halogen atoms are introduced into the polycarbosilanes of the prior art also depends directly on the presence of SiH groups in these polycarbosilanes, since only these SiH groups may be converted to SiHal groups (Hal=halogen) using the known processes for preparing halogenated polycarbosilanes. However, the formation of SiH groups in the pyrolytic preparation of polycarbosilanes is difficult to control, and this also has a direct effect on the properties of halogenated polycarbosilanes prepared therefrom. Furthermore, the degree and location of halogenation also is difficult to control in the preparation of known halogenated polycarbosilanes which is carried out under free radical halogenation conditions. Indeed, the SiH groups preferably react initially to form SiHal groups, yet there are considerable side reactions, particularly when long reaction times and slightly intensified reaction conditions are used. Hence, in addition to the required halogenation in the SiH groups, nonspecific halogenation reactions also occur in the hydrocarbon substituents, at silicon atoms, or in the methylene bridges of the polycarbosilane used. Furthermore, the free radical reaction conditions may lead to splitting reactions in the Si-C-Si backbone of the polycarbosilane, as a result of which the polycarbosilane and/or the halogenated polycarbosilane which is used may be partly degraded into undesirable fragments and volatile, low molecular weight compounds during the reaction.

SUMMARY OF THE INVENTION

It was therefore the object of the present invention to provide novel halogenated and non-halogenated polycarbosilanes which avoid the disadvantages of the prior art.

Another object of the invention is to provide novel polycarbosilanes having advantageous properties which can easily be adapted optimally to particular intended uses.

It is also an object of the invention to provide novel polycarbosilanes which heretofore have not been accessible in the prior art.

A further object is to provide simpler and more readily controllable processes for preparing such novel halogenated and non-halogenated polycarbosilanes.

These and other objects are achieved by means of the non-halogenated and halogenated polycarbosilanes of the invention and the processes of the invention for the preparation of these polycarbosilanes.

DETAILED DESCRIPTION OF PREFERRED EMBODIMENTS

The invention relates to polycarbosilanes composed of structural units corresponding to the formula I:

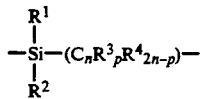
(I)

wherein

R$^1$ represents hydrogen, alkyl, cycloalkyl, aryl, arylalkyl or halogen, it being possible for R$^2$ to also have different meanings in various units of one and the same polycarbosilane, R$^2$ represents alkyl, cycloalkyl, aryl, arylalkyl or halogen, it being possible for R$^2$ to also have different meanings in various units of one and the same polycarbosilane, R$^3$ represents fluorine or phenyl, it being possible for R$^3$ to also have different meanings in various units of one and the same polycarbosilane, R$^4$ represents hydrogen, fluorine or phenyl, it being possible for R$^4$ to also have different meanings in various units of one and the same polycarbosilane, n represents the numeral 1 if R$^3$ and/or R$^4$ represent phenyl, and n represents an integer from 1 to 6 if R$^3$ represents fluorine and R$^4$ represents hydrogen or fluorine, it being possible for n to also have different meanings in various units of one and the same polycarbosilane, and p represents an integer from n to 2n−1, it being possible for p to also have different meanings in various units of one and the same polycarbosilane.

In one embodiment of the invention, the polycarbosilanes are composed of a number of different structural units corresponding to formula I arranged next to one another. These structural units may differ with regard to the groups R$^1$, R$^2$, R$^3$ and/or R$^4$, and with regard to the values n and/or p. The structural units of formula I which form the polycarbosilane are usually combinations of not more than a maximum of three R$^1$R$^2$Si units having different substituents and of not more than a maximum of three different (C$_n$R$_p^3$R$_{2n-p}^4$) units.

In one advantageous variant, each of the bridge substituents R$^3$ and R$^4$, and each of the values n and p in all structural units of formula I of the polycarbosilane has only a single meaning. For example, this provides polycarbosilanes in which the structural units of formula I are formed from combinations of not more than three R$^1$R$^2$Si units having different substituents and only one (C$_n$R$_p^3$R$_{2n-p}^4$) unit.

In another advantageous variant, each of the Si substituents R$^1$ and R$^2$ in all structural units of formula I of the polycarbosilane has only a single meaning. Polycarbosilanes composed of structural units of formula I are then provided in which all R$^1$R$^2$Si units are identical.

In a preferred variant there is only one single type of structural unit of formula I present in the polycarbosilanes of the invention. The R$^1$R$^2$Si units and the (C$_n$R$_p^3$R$_{2n-p}^4$) units are then identical in all structural units of the polycarbosilane composed of units of formula I.

R$^1$ may be hydrogen in the polycarbosilanes of the invention composed of structural units of formula I. R$^2$ then represents saturated or unsaturated alkyl, cycloalkyl, aryl, arylalkyl or halogen.

In the polycarbosilanes of the invention composed of structural units of formula I, the groups R$^1$ and/or R$^2$ may represent alkyl. As used herein the term "alkyl" refers to saturated or unsaturated, straight-chain or branched alkyl groups, which may optionally be further substituted by inert substituents. Examples of suitable alkyl groups include C$_1$ to C$_{16}$ alkyl groups, such as, for example, methyl, ethyl, propyl, butyl, pentyl, hexyl, octyl, dodecyl, hexadecyl, isopropyl, isobutyl, tertiary butyl, vinyl or allyl. C$_1$ to C$_6$ alkyl groups are particularly suitable. Lower alkyl groups having 1 to 4 carbon atoms, in particular methyl, ethyl, propyl, butyl and vinyl, are preferred.

In the polycarbosilanes of the invention composed of structural units of formula I, the groups R$^1$ and/or R$^2$ may represent cycloalkyl. As used herein the term "cycloalkyl" refers to a saturated or unsaturated cycloalkyl group optionally further substituted by inert substituents. Examples of suitable cycloalkyl groups include cyclopentyl, cyclohexyl, cyclopentenyl or cyclohexenyl.

In the polycarbosilanes of the invention composed of structural units of formula I, the groups $R^1$ and/or $R^2$ may represent aryl. As used herein the term "aryl" refers to an aromatic hydrocarbon group which may be unsubstituted or which may be substituted by inert substituents. Examples of suitable aryl groups include phenyl, naphthyl, p-diphenyl, or alkylaryl groups such as tolyl, ethylphenyl or propylphenyl. Phenyl groups are preferred.

In the polycarbosilanes of the invention composed of structural units of formula I, the groups $R^1$ and/or $R^2$ may represent arylalkyl. Examples of suitable arylalkyl groups include phenylmethyl and phenylethyl.

In the polycarbosilanes of the invention composed of structural units of formula I, the groups $R^1$ and/or $R^2$ may represent halogen. In particular, in this context the term "halogen" refers especially to chlorine, bromine, or fluorine.

In a sub-variant of the invention, the polycarbosilanes are characterized in that in the structural units of formula I, the group $R^3$ represents phenyl; the other groups $R^1$, $R^2$ and $R^4$, and the value p have the meanings given above, and n=1. In an advantageous embodiment of this sub-variant, the group $R^1$ is hydrogen or also phenyl. Polycarbosilanes are then provided in which the $R^1R^2Si$ units are linked to one another by phenylmethylene or diphenylmethylene bridges. Examples of phenyl-substituted methylene bridges of this type include phenylmethylene (—CHPh—), diphenylmethylene (—CPh$_2$) and phenylfluoromethylene (—CFPh—). In this variant of the invention the groups $R^1$ and/or $R^2$ in the Si units may have the above-mentioned meanings, especially hydrogen, lower alkyl having 1 to 4 carbon atoms (including unsaturated lower alkyl such as, for example vinyl), phenyl or halogen.

In another preferred sub-variant of the invention, the polycarbosilanes of the invention are characterized in that in the structural units of formula I, the group $R^3$ represents fluorine; the group $R^4$ represents hydrogen or fluorine, preferably fluorine; and the other groups $R^1$ and $R^2$ and the values n and p have the meanings given above. Polycarbosilanes according to the invention are then provided in which the $R^1R^2Si$ units are linked by partially fluorinated or perfluorinated hydrocarbon bridges containing 1 to 6 carbon atoms. In a preferred group of these polycarbosilanes, the $R^1R^2Si$ units of the polycarbosilane are linked by partially or completely fluorinated hydrocarbon bridges containing 1 to 3 carbon atoms, i.e. polycarbosilanes composed of the structural units of the formula I are provided in which n represents an integer from 1 to 3, and the groups $R^1$, $R^2$, $R^3$ and $R^4$ and the value p have the foregoing meanings. Preferred hydrocarbon bridges of this sub-variant of the polycarbosilanes of the invention are the perfluorinated hydrocarbon bridges in which $R^3$ and $R^4$ represent fluorine. Examples of suitable partially or completely fluorinated hydrocarbon bridges include bridges corresponding to the formula $(-C_nF_pH_{2n-p})-$ or to the formula $(-CF_2-)_n$, example monofluoromethylene, difluoromethylene, difluoroethylene, trifluoroethylene, tetrafluoroethylene, trifluoropropylene, tetrafluoropropylene, pentafluoropropylene, hexafluoropropylene and the like, up to and including dodecafluorohexylene.

The groups $R^1$ and/or $R^2$ may have the meanings given further above in the polycarbosilanes having partially fluorinated or perfluorinated hydrocarbon bridges. However, in a preferred embodiment of the subvariant of the polycarbosilanes of the invention having partially or completely fluorinated hydrocarbon bridges, the groups $R^1$ and $R^2$ in the structural units of formula I are characterized in that the group $R^1$ represents hydrogen, lower alkyl (optionally including unsaturated lower alkyl), phenyl or halogen, and the group $R^2$ represents lower alkyl (optionally including unsaturated lower alkyl), phenyl or halogen. As used herein the term "lower alkyl" refers to alkyl groups having 1 to 4 carbon atoms, in particular methyl, ethyl, propyl, butyl or vinyl. In this embodiment of the invention, for example, polycarbosilanes having partially or completely fluorinated hydrocarbon bridges are then present which contain dimethylsilylene, diethylsilylene and the like, methylethylsilylene, methylvinylsilylene, ethylvinylsilylene and the like, diphenylsilylene, methylphenylsilylene, ethylphenylsilylene and the like, methylhalosilylene, ethylhalosilylene and the like, phenylhalosilylene or dihalosilylene units as $R^1R^2Si$ units.

In a preferred embodiment, the polycarbosilanes of the invention having partially or completely fluorinated hydrocarbon bridges are characterized in that in the structural units of formula I, the group $R^2$ represents halogen, preferably chlorine, bromine or fluorine, $R^1$ having the aforementioned meaning hydrogen, lower alkyl (optionally including unsaturated lower alkyl), phenyl or halogen, and the groups $R^3$ and $R^4$ and the values n and p have the meanings given above for polycarbosilanes having partially or completely fluorinated hydrocarbon bridges. Si-halogenated or mixed Si-halogenated polycarbosilanes having partially or completely fluorinated hydrocarbon bridges are then provided which carry the same or different halogen atoms in the $R^1R^2Si$ units. Examples of halosilylene units of this type include methylchlorosilylene, methylbromosilylene, methylfluorosilylene, ethylchlorosilylene, ethylbromosilylene, ethylfluorosilylene and the like, phenylchlorosilylene, phenylbromosilylene, phenylfluorosilylene and also dihalosilylene, for example difluorosilylene.

In preferred polycarbosilanes of the variant having partially or completely fluorinated hydrocarbon bridges and halogenated Si units, the halogen atom in the Si unit is bromine or fluorine, particularly preferably fluorine. Preferred examples of these halogenated polycarbosilanes are formed, for example, from methylbromosilylene units and tetrafluoroethylene units or from methylfluorosilylene units and tetrafluoroethylene units.

The invention also includes mixed halogenated polycarbosilanes, i.e. polycarbosilanes in which the halogen atoms chlorine, bromine and/or fluorine may be present adjacent one another.

In a further variant of the invention the polycarbosilanes may be cross-linked by branching groups corresponding to the formula II and/or to the formula III:

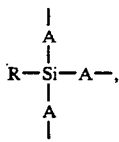

(II)

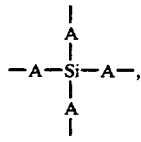

(III)

wherein
A represents a group $C_nR_p^3R_{2n-p}^4$, in which the groups $R^3$ and $R^4$ and the values n and p have the above meanings, and R represents hydrogen or alkyl, cycloalkyl, aryl or arylalkyl having the above meanings.

The polycarbosilanes of the invention may be crosslinked by proportions of up to 50% of the branching groups II and/or III.

The polycarbosilanes of the invention composed of structural units of formula I may have different end groups. The end groups may be halogen, alkyl, cycloalkyl, arylalkyl, aryl, alkoxy or hydroxy groups. Examples of suitable end groups include chlorine, bromine, fluorine, methyl, phenyl, methoxy and hydroxy.

The polycarbosilanes of the invention are solid or liquid, wax-like, viscous or solid materials having a structure in which essentially every silicon atom is bonded only to carbon atoms. These polycarbosilanes are characterized by a maximum Si—Si bond proportion of only 5%. In the examples of the invention the Si—Si bond proportion is even less than 1%.

The number of structural units of formula I which form the polycarbosilanes of the invention is generally between 10 and 500, preferably between 30 and 150. The polycarbosilanes thus have average molecular weights in the range from 600 to 300,000 g/mole, preferably in the range from 700 to 30,000 g/mole.

The invention also relates to a process for preparing polycarbosilanes composed of structural units of formula I, wherein
a) for preparing polycarbosilanes composed of structural units corresponding to formula Ia:

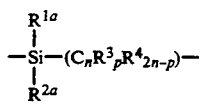

(Ia)

wherein
$R^{1a}$ represents hydrogen, alkyl, cycloalkyl, aryl or arylalkyl, whereby $R^{1a}$ can have the same or different meanings in various units of one and the same polycarbosilane, $R^{2a}$ represents alkyl, cycloalkyl, aryl or arylalkyl, whereby $R^{2a}$ can have the same or different meanings in various units of one and the same polycarbosilane, $R^3$ represents fluorine or phenyl, whereby $R^3$ can have the same or different meanings in various units of one and the same polycarbosilane, $R^4$ represents hydrogen, fluorine or phenyl, whereby $R^4$ can have the same or different meanings in various units of one and the same polycarbosilane, n represents the numeral if $R^3$ and/or $R^4$ represent phenyl, or n represents an integer from 1 to 6 if $R^3$ represents fluorine and $R^4$ represents hydrogen or fluorine, whereby n can have the same or different values in various units of one and the same polycarbosilane, and p represents an integer from n to 2n−1, whereby p can have the same or different meanings in various units of one and the same polycarbosilane, said process comprises the steps of: reacting a dihalosilane corresponding to the formula IV

(IV)

with a dibromide compound corresponding to the formula V

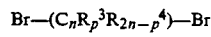

(V)

wherein
X represents the halogens chlorine, bromine or iodine, preferably chlorine or bromine, and $R^{1a}$, $R^{2a}$, $R^3$, $R^4$, n and p have the meanings given above, in a Grignard polycondensation reaction with magnesium metal, or b) for preparing polycarbosilanes composed of structural units corresponding to the formula Ib

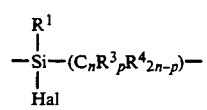

(Ib)

wherein
$R^1$ represents hydrogen, alkyl, cycloalkyl, aryl, arylalkyl or halogen, whereby $R^1$ can have the same or different meanings in various units of one and the same polycarbosilane, Hal represents halogen, preferably chlorine, bromine or fluorine, whereby Hal can have the same or different meanings in various units of one and the same polycarbosilane, and $R^3$, $R^4$, n and p have the above meanings, said process comprising the steps of:
ba) reacting a polycarbosilane composed of structural units corresponding to the formula Ic:

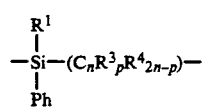

(Ic)

wherein
$R^1$ has the same meaning as $R^1$, and $R^3$, $R^4$, n and p have the above meanings, with at least one halogenating reagent under polar or ionic reaction conditions, optionally in the presence of a Lewis acid, in such a way that the phenyl substituents Ph in the structural units of formula Ic, and optionally in the groups $R^1$=Ph, are partially or completely exchanged for halogen atoms, and bb) optionally thereafter completely or partially exchanging the halogen introduced into the polycarbosilane in step ba) under polar or ionic reaction conditions for another halogen atom.

In accordance with the invention, in process variant a) for preparing polycarbosilanes composed of structural units of formula Ia, at least one dihalosilane corresponding to formula IV and at least one dibromohydrocarbon of formula V are reacted with each other in a Grignard polycondensation reaction in the presence of magnesium and in the presence of an organic solvent suitable for Grignard reactions.

In the dihalosilanes of formula IV used in process variant a), $R^{1a}$ may be hydrogen. $R^{2a}$ then represents alkyl, cycloalkyl, aryl or arylalkyl.

In the dihalosilanes of formula IV used in process variant a), one or both groups $R^{1a}$ or $R^{2a}$ may represent alkyl. In this context the term "alkyl" has the meaning given above, namely a saturated or unsaturated, straight-chain or branched alkyl group which optionally may be further substituted by inert groups. Examples of suitable alkyl groups include, in particular, the $C_1$ to $C_{16}$ alkyl groups mentioned above, but especially the preferred $C_1$ to $C_6$ alkyl groups. Lower alkyl groups, including unsaturated lower alkyl groups, having 1 to 4 carbon atoms are particularly preferred.

In the dihalosilanes of formula IV used in process variant a), one or both groups $R^{1a}$ or $R^{2a}$ may represent cycloalkyl. In this context the term "cycloalkyl" refers to the meaning given above of a saturated or unsaturated cycloalkyl group optionally further substituted by an inert substituent. Examples of suitable cycloalkyl groups include cyclopentyl, cyclohexyl or cyclopentenyl, cyclohexenyl.

In the dihalosilanes of formula IV used in process variant a), one or both groups $R^{1a}$ or $R^{2a}$ may represent aryl. In this context "aryl" refers to the meaning given above of an aromatic hydrocarbon group which is unsubstituted or has inert substituents. Examples of suitable "aryl" groups include phenyl, naphthyl, p-diphenyl, or alkylaryl groups, such as tolyl, ethylphenyl or propylphenyl. Phenyl is most preferred as an aryl group.

In the dihalosilanes of formula IV used in process variant a), one or both groups $R^{1a}$ or $R^{2a}$ may represent arylalkyl. Examples of suitable arylalkyl groups include phenylmethyl or phenylethyl.

The dichlorosilanes or dibromosilanes are particularly suitable as dihalosilanes for process variant a) of the invention. Examples of particularly suitable dihalosilanes include dimethyldichlorosilane, dimethyldibromosilane, diethyldichlorosilane, diethyldibromosilane, methylphenyldichlorosilane, methylphenyldibromosilane, diphenyldichlorosilane, diphenyldibromosilane, methylvinyldichlorosilane, methylhydrogendichlorosilane, and comparable dihalosilanes.

In the dibromohydrocarbons of formula V used in process variant a), the group $R^3$ may represent fluorine or phenyl, and the group $R^4$ may represent hydrogen, fluorine or phenyl. Phenyl-substituted dibromomethanes and particularly partially or completely fluorinated dibromohydrocarbons having 1 to 6 carbon atoms are suitable as dibromohydrocarbons for process variant a) of the invention. Examples of suitable phenyl-substituted dibromomethanes include phenyldibromomethane and diphenyldibromomethane. Examples of preferred and particularly suitable partially or completely fluorinated dibromohydrocarbons include compounds corresponding to the formula Br-$(C_nF_pH_{2n-p})$-Br or to the formula Br—$(C_nF_{2n})$—Br, in which the values n and p have the meanings already given above. Predominantly fluorinated dibromohydrocarbons, i.e. compounds corresponding to the above formula Br—$(C_nF_pH_{2n-p})$—Br in which $p \gg n$ and ranges up to a maximum value of $2n-1$, are preferred. Perfluorinated dibromohydrocarbons corresponding to the formula Br—$(C_nF_{2n})$—Br are particularly preferred, such as for example dibromodifluoromethane, dibromotetrafluoroethane, dibromohexafluoropropane, dibromooctafluorobutane, dibromodecafluoropentane or dibromododecafluorohexane.

The magnesium used in process variant a) of the invention is used as a metal in the form of magnesium powder, magnesium filings, magnesium granules, or the like. The magnesium metal may be pretreated for use in the Grignard reaction by measures known to persons skilled in the art. It is recommended, for example, to degrease the magnesium before the reaction; to dry the magnesium to remove adhering moisture; and/or to partially etch the magnesium, optionally using small amounts of lower bromine- or iodine-containing hydrocarbons, such as dibromoethane, dibromopropane, diiodopropane and the like, but preferably using elemental iodine. The amount of magnesium metal to be used is approximately two moles per mole of the dihalosilane used or the dibromohydrocarbon used. The dihalosilane and the dibromohydrocarbon are used in the reaction in approximately equimolar amounts.

The organic solvent in which the Grignard polycondensation reaction takes place may be any dry solvent which is compatible with Grignard reagents, in particular an ether such as diethyl ether, dioxane, tetrahydrofuran and the like.

The Grignard polycondensation reaction of the invention is generally carried out in such a way, for example, that the starting compounds, the dihalosilane and the dibromohydrocarbon, are initially placed with the magnesium, preferably in ether. Tetrahydrofuran is then added dropwise, and the exothermic reaction is controlled by adjusting the rate of dropwise addition of tetrahydrofuran so that even boiling takes place. For good results, dry reaction conditions should be maintained, and the reaction should be carried out under a protective gas atmosphere with stirring. Suitable protective gases include, for example, nitrogen or noble gases such as argon. The temperature attained during the reaction depends on the boiling point of the solvent used. When the exothermic reaction is completed, stirring of the reaction mixture is usually continued at room temperature for a longer period of time to assure that the reaction is complete. The reaction is typically carried out within a period of 1 to 48 hours. The Grignard reaction mixture may be worked up and the resulting polycarbosilane isolated in a known manner for working up Grignard reactions. Radicals of unreacted Grignard reagents may be decomposed, for example, by adding or pouring the Grignard reaction mixture into water, hydrochloric acid, aqueous ammonium chloride solution and the like, and the polycarbosilane may then be extracted from the reaction mixture using a suitable organic solvent, for example using halogenated hydrocarbons, such as methylene chloride, chloroform, carbon tetrachloride, or fluorochlorohydrocarbons and recovered by removing the solvent in a known manner.

The process of subvariant a) of the invention makes a simple and generally applicable method available for easy preparation of various polycarbosilanes. In particular, polycarbosilanes, in which the Si units are linked to one another by partially or completely fluorinated hydrocarbon bridges can be prepared according to this process. By varying the type and number of reactants used, the process of the invention permits the preparation of a number of interesting polycarbosilanes which have not been accessible in the prior art, particularly polycarbosilanes in which the hydrocarbon groups are partially or completely fluorinated.

In a further variant of the process a) of the invention, it is possible, if desired, to effect additional specific cross-linking of the linear polycarbosilane chain based on the general structural formula Ia. Depending on the degree of cross-linking required, up to 50 mole % of the dihalosilane IV used is then replaced by a trihalosilane corresponding to the formula $RSiX_3$, in which X represents halogen, preferably chlorine or bromine, and R has the meaning given above for $R^1$, namely hydrogen, alkyl, cycloalkyl, aryl or arylalkyl. The trihalosilane $RSiX_3$ may be mixed directly with the reactant mixture of dihalosilane IV, dibromohydrocarbon V and magnesium. Alternatively, it may also be added dropwise separately from this reactant mixture. Examples of trihalosilanes $RSiX_3$ which can be used include trichlorosilane, methyltribromosilane, methyltrichlorosilane or phenyltrichlorosilane. The cross-linked polycarbosilanes described above which additionally contain branching groups corresponding to the formula II are obtained by this process variant.

Furthermore, in a further process variant, the linear polycarbosilane chains formed of units corresponding to the formula Ia can be cross-linked by adding tetrahalosilanes, such as tetrachlorosilane or tetrabromosilane. The cross-linked polycarbosilanes also described above, which additionally contain branching groups corresponding to the formula III, are obtained in this way.

Moreover, in a further process variant the degree of condensation of the chain-like or cross-linked polycarbosilanes to be prepared may be controlled by stopping the Grignard condensation by adding condensation terminating reagents. Suitable reagents for terminating the condensation reaction include monohalosilanes $R_3SiX$, in which X represents halogen, preferably chlorine or bromine, and R' represents alkyl, cycloalkyl, aryl or arylalkyl. Further suitable reagents for terminating the condensation reaction include, for example, fluorinated monobromohydrocarbons. Specific examples of suitable monohalosilanes include trimethylchlorosilane, trimethylbromosilane or diphenylmethylchlorosilane. Specific examples of suitable fluorinated monobromohydrocarbons include trifluorobromomethane or pentafluorobromoethane.

In order to carry out process variant b) for preparing polycarbosilanes composed of structural units corresponding to the formula Ib, aryl-substituted polycarbosilanes are reacted as educts for up to several hours, optionally in the presence of a Lewis acid as a catalyst, with at least one halogenating reagent which reacts in a polar or ionic manner under a protective gas atmosphere in an organic solvent which is inert under the reaction conditions while substantially excluding water.

All polycarbosilanes prepared according to process variant a) which carry phenyl substituents on the silicon atoms may be used as polycarbosilane educts for this purpose.

Conventional halogenating reagents which react in a polar or ionic manner may be used to prepare the polycarbosilanes halogenated at the Si atoms according to the invention from the phenyl-substituted polycarbosilanes described above. Any halogenating reagents which can only react in a free radical manner are therefore excluded. Suitable halogenating reagents for the reactions mentioned include hydrohalic acids, such as HBr, HCl or HF; ammonium salts of these hydrohalic acids, such as $NH_4Br$, $NH_4Cl$ or $NH_4F$; acid alkali fluorides, such as sodium hydrogen fluoride ($NaHF_2$ or $NaF\cdot HF$) or acid potassium fluorides, such as $KF\cdot(HF)_n$ where n=1 to 3; hydrogen fluoride adducts with ammonium fluoride, such as $NH_4F\cdot(HF)_n$ or $NH_4F\cdot HF$; or further halogenating reagents, such as phosphorus pentachloride, antimony pentachloride, antimony trifluoride, arsenic trifluoride, titanium tetrafluoride, tin tetrafluoride, copper difluoride, zinc difluoride and the like. Halogenating reagents preferred here include the hydrohalic acids and ammonium salts thereof, the hydrogen fluoride adducts with ammonium fluoride, and the acid alkali fluorides. Indeed, elemental halogens may also be used under polar or ionic reaction conditions. If some of the phenyl substituents are to be retained in the halogenated polycarbosilane, care should be taken in the process to ensure that electrophilic, aromatic substitution of hydrogen atoms by halogen atoms can also take place in the remaining phenyl substituents (in addition to the exchange of phenyl substituents for halogen atoms). On the other hand, such electrophilic aromatic substitution in the phenyl substituents does not take place when using the other halogenating reagents mentioned above.

The polar or ionic reaction of the halogenating reagent is assured first by using halogenating reagents which are themselves already compounds having a polar or ionic reaction, such as for example HCl, HF, $NH_4Cl$, $NH_4F$, $NH_4F\cdot(HF)_n$, $NaF\cdot HF$, $KF\cdot(HF)_n$, $PCl_5$, $SbCl_5$, $SbF_3$, $AsF_3$, $TiF_4$, $SnF_4$, $CuF_2$, $ZnF_2$, etc. Second, the polar or ionic reaction conditions are assured when using halogenating reagents which may react both in a polar or ionic as well as a free radical manner (for example HBr, halogens), by carrying out the reactions in the presence of Lewis acid catalysts. However, the presence of Lewis acid catalysts may be advantageous even in reactions using halogenating reagents which themselves already react in a polar or ionic manner and which themselves are not Lewis acids, for example, in reactions using hydrogen chloride. The known electrophilic and catalytically active electron pair acceptor compounds of the halogens with the elements boron, aluminum, phosphorus, antimony, arsenic, iron, zinc or tin are suitable as Lewis acid catalysts for preparing halogenated polycarbosilanes by the process of the invention. Examples of suitable Lewis acid catalysts include compounds such as $BF_3$, $AlCl_3$, $AlBr_3$, $PCl_5$, $SbCl_5$, $SbF_3$, $ZnF_2$, etc.

The organic solvent in which the halogenation reactions of process variant b) take place may be any solvent in which the polycarbosilanes used as educts are soluble and which is compatible with the halogenation reagents and the optionally present Lewis acid catalysts. Preferably the organic solvent also is a solvent for the halogenated polycarbosilanes to be prepared according to the invention. Suitable solvents include, for example, hydrocarbons such as benzene, toluene, xylene or paraffins, or completely or partially halogenated hydrocarbons such as carbon tetrachloride, chloroform, methylene chloride, dichloroethane, fluorochlorohydrocarbons or hydrogen-containing fluorochlorohydrocarbons. Those solvents which can easily be removed again by distillation after the reaction are advantageously used. The amount of solvent may be varied within wide limits depending on the practical requirements.

The halogenation reactions of process variant b) may be carried out readily at temperatures of about room temperature. Furthermore, the reactions are generally carried out under a suitable protective gas. Suitable protective gases include, for example, nitrogen or argon. The degree of halogenation of the products may easily be controlled in these reactions, on the one hand by selecting the number of exchangeable substituents (for example phenyl) in the polycarbosilane educt, or on the other hand by increasing or decreasing the reaction time and/or the amount of halogenating reagent introduced.

The reaction is generally carried out in such a way that gaseous halogenating reagents are introduced into an anhydrous solution of the polycarbosilane, optionally containing catalytic amounts of Lewis acid catalyst. If on the other hand, solid halogenating reagents are used, such as for example acid alkali fluorides, ammonium fluoride or ammonium fluoride-HF adducts, these halogenating reagents are initially introduced into the reaction vessel as such (for example in powder form) or suspended in a solvent, optionally together with a Lewis acid catalyst. A solution of the educt polycarbosilane is then added dropwise.

When the reaction is completed, the halogenated polycarbosilane may be recovered from the reaction mixture by any suitable method. If the halogenated polycarbosilane is soluble in the solvent, the other insoluble components, for example the Lewis acid catalyst optionally suspended in the solvent, can be separated by filtration. The halogenated polycarbosilane remaining in the solvent may then optionally be subjected to further purification measures and may be isolated by removing the solvent. If the halogenated polycarbosilane which forms is insoluble in the solution, it may be dissolved using another solvent which is suitable, separated from insoluble components by filtration, and isolated by removing the solvent. The isolated products may then be additionally treated ("dried") in vacuo, and optionally at elevated temperatures, to remove any adhering solvent residues.

Polycarbosilanes halogenated on the Si atoms, both uniformly, i.e. having only one type of halogen atom on the Si atoms, and mixed halogenated polycarbosilanes, i.e. polycarbosilanes having various halogen atoms on the Si atoms, may be obtained according to this process variant b). Polycarbosilanes halogenated uniformly on the Si atoms are obtained, for example, by reacting a polycarbosilane of the type described above which is not halogenated on the Si atoms as a starting compound with a single halogenating agent. On the other hand, polycarbosilanes having mixed halogens on the Si atoms can also be prepared directly from educt polycarbosilanes which are not halogenated on the Si atoms, by reacting the polycarbosilanes simultaneously with, for example, two halogenating agents carrying different halogen atoms. Polycarbosilanes containing chlorine and bromine can, for example, be obtained in this manner using an HCl/HBr gas mixture. The reaction conditions in this case are analogous to the conditions used in reactions involving only a single halogenating reagent.

Furthermore, it is also possible to prepare polycarbosilanes halogenated uniformly on the Si atoms starting from polycarbosilanes already halogenated on the Si atoms with a different halogen atom by means of complete halogen exchange. For example, chlorine or bromine atoms may advantageously be exchanged in this manner for fluorine atoms on the Si atoms of the polycarbosilane. On the other hand, if only partial halogen exchange is carried out at the Si atoms, a polycarbosilane having mixed halogens on the Si atoms is obtained as a product from a starting polycarbosilane which was uniformly haloqenated on the Si atoms. Hence, for example, Si-chlorine/fluorine-containing polycarbosilanes can be prepared from Si-chlorinated polycarbosilanes by partial exchange of the Si-chlorine atoms for fluorine atoms. Furthermore, it is also possible to convert mixed Si-halogenated polycarbosilanes to other mixed Si-halogenated polycarbosilanes. Hence, for example, Si-chlorine/fluorine-containing polycarbosilanes can also be prepared in this manner from Si-chlorine/bromine-containing polycarbosilanes. In this process the reaction may be controlled easily so that initially only the Si-bromine atoms are completely exchanged for fluorine atoms, and, in contrast, the Si-chlorine atoms are retained in the polycarbosilane. The reaction conditions for these Si-halogen exchange reactions are analogous to the conditions already described above for the Si-halogenation reactions. It is possible using this Si-halogen exchange technique to also easily obtain those polycarbosilanes halogenated on the Si atoms which can be prepared by direct means (that is without transhalogenation) only with difficulty or in unsatisfactory yields. The bromine atom is most particularly advantageously suitable as a halogen atom which is to be exchanged for a further halogen atom on the Si atoms.

The fluorinating agents which are particularly suitable for this halogen exchange include hydrogen fluoride, ammonium fluoride or adducts of hydrogen fluoride with ammonium fluoride, acid alkali fluorides and also $SbF_3$, $AsF_3$, $TiF_4$, $SnF_4$, $CuF_2$, $ZnF_2$ etc. The ammonium salts, for example $NH_4F\cdot(HF)_n$, $NH_4F\cdot HF$ or $NH_4F$, are preferred because when they are used, the presence of additional Lewis acid catalysts is superfluous. Furthermore, the reactions can easily be carried out such that either all chlorine or bromine atoms contained in the educt, or only some of the chlorine or bromine atoms contained in the educt, are exchanged. Furthermore, it also is readily possible to exchange only, for example, the bromine atoms partially or completely from chlorine/bromine-containing polycarbosilanes without changing the chlorine content. Hence chlorine/fluorine-containing polycarbosilanes are obtained when there is complete exchange of bromine for fluorine, or polycarbosilanes having mixed halogens on the Si atoms and containing fluorine, chlorine and bromine atoms at the same time are obtained when the bromine atoms are only partially exchanged. Under more intensive reaction conditions, the aryl substituents, which are optionally still present in the polycarbosilane, are also completely or partially exchanged for fluorine atoms.

The polycarbosilanes of the invention are distinguished by defined properties which can be determined by specifically varying the molecular size, the number and type of cross-linking, by appropriately selecting the groups $R^1$, $R^2$, $R^3$ and $R^4$ the values n and p, and by the type and content of the halogen atoms. Of the Si-halogenated polycarbosilanes, the Si-fluorinated polycarbosilanes are particularly advantageous because of their unexpectedly high degree of stability, as a result of which they are especially suitable for numerous applications. The more reactive Si-bromine-containing products are particularly advantageously suitable as educts for halogen exchange reactions and other exchange reactions. Polycarbosilanes having partially or completely fluorinated hydrocarbon bridges, which produce a broad spectrum of liquid, viscous and solid products as a function of the degree of fluorination, have particularly advantageous properties. Similar favorable chemical and physical properties are also achieved with Si-halogenated, particularly Si-fluorine-containing, polycarbosilanes.

The polycarbosilanes of the invention, particularly the bridge-fluorinated and/or Si-fluorinated polycarbosilanes, are suitable as valuable starting polymers for preparing silicon carbide ceramics of high technical quality. They are also outstandingly suitable for various other technical applications, for example as binding materials or coating materials. Further possibilities for use include impregnation, treatment of fibers, and as working fluids such as hydraulic oils, and other areas of application in which conventional polycarbosilanes also are used.

In contrast to the processes known in the prior art, the process of the invention for preparing the polycarbosilanes of the invention, in particular the bridge-fluorinated and/or Si-fluorinated polycarbosilanes, makes it possible to prepare specific and precisely defined polycarbosilanes having any desired composition and consistency, particularly compounds which are fluorinated in their hydrocarbon bridges and optionally also Si-halogenated polycarbosilanes. The properties of the polycarbosilanes of the invention may be modified in a simple and specific manner by means of these processes with respect to the type and the degree of bridge fluorination and also of Si-halogenation. A number of polycarbosilanes, particularly bridge-fluorinated polycarbosilanes, may thus be made available which may be adapted in optimum manner to a particular intended use by means of specific modifications.

The invention is described in further detail in the following illustrative examples, which are not limiting in scope. Unless otherwise stated, parts and percentages given in the examples are understood to refer to parts by weight or percentages by weight. All reactions were carried out in standard laboratory apparatus. The compounds prepared were analyzed by elemental analysis and spectroscopic methods (NMR=nuclear magnetic resonance spectroscopy: $^1$H-NMR using TMS as standard, $^{19}$F-NMR using CCl$_3$F as standard); IR=infrared spectroscopy; MS=mass spectroscopy. Abbreviations used denote: Ph=phenyl, Me=methyl, Vi=vinyl, TMS=tetramethylsilane.

EXAMPLE 1

5 to 10 ml of tetrahydrofuran were added dropwise to 0.075 mole of diphenyldichlorosilane (18.9 g; 15.3 ml) and 0.075 mole of difluorodibromomethane (15.75 g; 6.9 ml) in 100 ml of diethyl ether with 3.9 g of magnesium filings (previously partially etched using iodine) under argon. When the reaction started, a further 30 to 40 ml of tetrahydrofuran were added dropwise, and the exothermic reaction which proceeded with boiling of the solvent was controlled by adjusting the rate of addition of the solvent. When the reaction was completed, the resulting reaction mixture was stirred for a further 15 hours at room temperature. The reaction mixture was then added to an ammonium chloride solution, treated with 250 ml of carbon tetrachloride, and the organic phase was separated. The organic phase was then washed using approximately 300 ml of water, and the solvent was evaporated. The residue was dried for a further 2 hours at 110° C. in vacuo. 16.9 g of polydiphenylsilyldifluoromethylcarbosilane were obtained as a red, viscous liquid. The elemental analysis of this material showed a Si content of 10.6%. $^1$H-NMR analysis: 7.2 ppm (phenyl). $^{19}$F-NMR analysis: −140 ppm (CF$_2$). IR analysis (cm$^{-1}$): 3070, 3040 (C—H stretching vibration, phenyl); 2960, 2930 (C—H stretching vibration); 1600, 1500 (C=C); 1100–1000 and 840–680 (carbosilane backbone vibrations); the CF vibration bands coincide with the backbone vibrations.

EXAMPLE 2 THROUGH EXAMPLE 9

The following polycarbosilanes were prepared by Grignard polycondensation in a manner analogous to Example 1. For this purpose 0.075 mole of a dichlorosilane was reacted in each case with 0.075 mole of a dibromohydrocarbon. The amount of dichlorosilane reacted in these examples was: 18.9 g of diphenyldichlorosilane (Ph$_2$SiCl$_2$); 14.3 g of methylphenyldichlorosilane (MePhSiCl$_2$); 9.6 g of dimethyldichlorosilane (Me$_2$SiCl$_2$); 10.5 g of vinylmethyldichlorosilane (MeViSiCl$_2$); 8.6 g of methylhydrogendichlorosilane (MeHSiCl$_2$). The amount of dibromohydrocarbon reacted here was: 19.5 g of 1,2-dibromotetrafluoroethane (BrC$_2$F$_4$Br); 15.8 g of dibromodifluoromethane (CF$_2$Br$_2$). The results which were obtained are compiled in the following Table 1:

TABLE 1

| | | | Polycarbosilane | |
|---|---|---|---|---|
| Exp.*) | Hydrocarbon used | Dichlorosilane used | Yield (g) | Properties |
| 2 | CF$_2$Br$_2$ | MePhSiCl$_2$ | 9.3 | Brownish, viscous liquid: 11.4% Si. $^1$H-NMR (ppm): 7.2 (Ph); 0.5 (CH$_3$). $^{19}$F-NMR (ppm): −134; −135 (CF$_2$). IR (cm$^{-1}$): as in Exp. 1; additionally 1257 (Si—CH$_3$; stretching vibration). |
| 3 | CF$_2$Br$_2$ | Me$_2$SiCl$_2$ | 1.7 | Brown, viscous liquid $^1$H-NMR (ppm): 0.5 (CH$_3$). IR (cm$^{-1}$): 2960, 2930 (C—H stretching vibration); 1257 (Si—CH$_3$; stretching vibration); 1100–1000, 840–680 (carbosilane backbone vibrations); the CF$_2$ vibrations bands coincide with the carbosilane backbone vibrations. |

TABLE 1-continued

| Exp.*) | Hydrocarbon used | Dichlorosilane used | Polycarbosilane Yield (g) | Properties |
|---|---|---|---|---|
| 4 | $CF_2Br_2$ | $MeViSiCl_2$ | 3.7 | Brown, viscous liquid: 8.8% Si.<br>$^1$H-NMR (ppm): 6.2 (Vinyl-H); 0.5 ($CH_3$).<br>$^{19}$F-NMR (ppm): −135 ($CF_2$)<br>IR ($cm^{-1}$): as in Exp. 3; additionally 1600, 1500 (C=C) |
| 5 | $BrC_2F_4Br$ | $Ph_2SiCl_2$ | 14.9 | Viscous, brown solid: 13.8% Si.<br>$^1$H-NMR (ppm): 7.2 (Ph).<br>$^{19}$F-NMR (ppm): −140 ($CF_2$).<br>IR ($cm^{-1}$): as in Exp. 1. |
| 6 | $BrC_2F_4Br$ | $MePhSiCl_2$ | 10.8 | Reddish brown liquid: 17.0% Si.<br>$^1$H-NMR (ppm): 7.2 (Ph); 0.5 ($CH_3$).<br>$^{19}$F-NMR (ppm): −134.8 ($CF_2$)<br>IR ($cm^{-1}$): as in Exp. 2. |
| 7 | $BrC_2F_4Br$ | $Me_2SiCl_2$ | 3.7 | Brown liquid: 12.6% Si.<br>$^1$H-NMR (ppm): 0.5 ($CH_3$)<br>$^{19}$F-NMR (ppm): −130 bis −133 ($CF_2$).<br>IR ($cm^{-1}$): as in Exp. 3. |
| 8 | $BrC_2F_4Br$ | $MeViSiCl_2$ | 6.6 | Brown liquid: 23.5% Si.<br>$^1$H-NMR (ppm): 6.2 (Vinyl-H): 0.5 ($CH_3$).<br>$^{19}$F-NMR (ppm): −135, 9 ($CF_2$).<br>IR ($cm^{-1}$): as in Exp. 4. |
| 9 | $BrC_2F_4Br$ | $MeHSiCl_2$ | 2.7 | Brown liquid: 22.7% Si.<br>$^1$H-NMR (ppm): 4.7 (SiH): 0.5 ($CH_3$).<br>$^{19}$F-NMR (ppm): −133 ($CF_2$).<br>IR ($cm^{-1}$): as in Exp. 3; additionally: 2100 (Si—H stretching vibration). |

*)Exp. = Example

EXAMPLE 10

5 to 10 ml of tetrahydrofuran were added dropwise to 0.075 mole of diphenyldichlorosilane (18.9 g; 15.3 ml) and 0.075 mole of benzal bromide (Br CHPh; 18.8 g) in 100 ml of diethyl ether with 3.9 g of magnesium filings (previously partially etched using iodine) under argon. When the reaction started a further 30 to 40 ml of tetrahydrofuran were added dropwise, and the exothermic reaction proceeding while the solvent boils was controlled by adjusting the rate of addition of the solvent. When the reaction was completed, the resulting reaction mixture was stirred for a further 15 hours at room temperature. The reaction mixture was then added to an ammonium chloride solution, treated with 250 ml of carbon tetrachloride, and the organic phase was separated. The organic phase was then washed using approximately 300 ml of water, and the solvent was subsequently evaporated. The residue was dried in vacuo for a further 2 hours at 110° C. 17.1 g of a polycarbosilane were obtained as a viscous reddish-brown solid. The elemental analysis of this material showed a content of 12.0% Si; 76.6% C; and 6.1% H. $^1$H-NMR analysis: 7.2 ppm (phenyl); 3.6 (CH). IR analysis ($cm^{-1}$): 3070, 3040 (C—H stretching vibration, phenyl); 2960, 2930 (C—H stretching vibration); 1600, 1500 (C=C); 1100–1000 and 840–680 (carbosilane backbone vibrations).

EXAMPLE 11 THROUGH EXAMPLE 19

The following polycarbosilanes were prepared by Grignard polycondensation in manner analogous to Example 10. For this purpose 0.075 mole of a dichlorosilane was reacted in each case with 0.075 mole of a dibromohydrocarbon. The amount of dichlorosilane reacted in these examples was: 18.9 g of diphenyldichlorosilane ($Ph_2SiCl_2$); 14.3 g of methylphenyldichlorosilane ($MePhSiCl_2$); 9.6 g of dimethyldichlorosilane ($Me_2SiCl_2$); 10.5 g of vinylmethyldichlorosilane ($MeViSiCl)_2$); 8.6 g of methylhydrogendichlorosilane ($MeHSiCl_2$). The amount of dibromohydrocarbon reacted here was: 18.8 g of benzal bromide ($Br_2CHPh$); 24.6 g of dibromodiphenylmethane ($Br_2CPh_2$). The results which were obtained are compiled in the following Table 2:

TABLE 2

| Exp.*) | Hydrocarbon used | Dichlorosilane used | Polycarbosilane Yield (g) | Properties |
|---|---|---|---|---|
| 11 | $Br_2CHPh$ | $MePhSiCl_2$ | 13.3 | Viscous, reddish brown solid: 13.7% Si; 75.8% C; 6.7% H.<br>$^1$H-NMR (ppm): 7.2 (Ph); 3.0–3.6 (CH); 0.5 ($CH_3$).<br>IR ($cm^{-1}$): as in Exp. 10; additionally 1257 (Si—$CH_3$); stretching vibration). |
| 12 | $Br_2CHPh$ | $Me_2SiCl_2$ | 10.3 | Viscous, brown solid: 15.9% Si; 69.5% C; 7.8% H.<br>$^1$H-NMR (ppm): 7.2 (Ph); 2.3 (CH); 0.4 ($CH_3$).<br>IR ($cm^{-1}$): as in Exp. 11. |
| 13 | $Br_2CHPh$ | $MeViSiCl_2$ | 11.3 | Viscous, reddish brown solid: 16.5% Si; 71.1% C; 7.4% H.<br>$^1$H-NMR (ppm): 7.2 (Ph); 5.8 (Vinyl-H): 2.5 (CH); 0.5 ($CH_3$). |

TABLE 2-continued

| Exp.[a] | Hydrocarbon used | Dichlorosilane used | Polycarbosilane Yield (g) | Properties |
|---|---|---|---|---|
| 14 | Br$_2$CHPh | MeHSiCl$_2$ | 7.1 | IR (cm$^{-1}$): as in Exp. 11. Viscous, dark red solid: 20.3% Si; 59.9% C; 6.3% H. $^1$H-NMR (ppm): 7.2 (Ph); 4.5 (SiH); 2.0 (CH); 0.3 (CH$_3$). IR (cm$^{-1}$): as in Exp. 11; additionally: 2100 (Si—H, stretching vibration). |
| 15 | Br$_2$CPh$_2$ | Ph$_2$SiCl$_2$ | 24.8 | Yellow solid: 7.8% Si. $^1$H-NMR (ppm): 7.2 (Ph). |
| 16 | Br$_2$CPh$_2$ | MePhSiCl$_2$ | 20.4 | Yellowish brown solid: 8.5% Si. $^1$H-NMR (ppm): 7.2 (Ph); 0.5 (CH$_3$). |
| 17 | Br$_2$CPh$_2$ | Me$_2$SiCl$_2$ | 7.5 | Brown solid: 7.5% Si. $^1$H-NMR (ppm): 7.2 (Ph); 0.5 (CH$_3$). |
| 18 | Br$_2$CPh$_2$ | MeHSiCl$_2$ | 3 | Brown solid |
| 19 | Br$_2$CPh$_2$ | MeViSiCl$_2$ | 8 | Brownish yellow solid |

[a] Exp. = Example

EXAMPLE 20

15 g of polymethylphenylsilyltetrafluoroethylene carbosilane (—SiMePh—C$_2$F$_4$—)$_n$ from Example 6 were dissolved in 400 ml of dry benzene, and 1.3 g of aluminum bromide were added. Hydrogen bromide was passed through the solution over a period of 30 hours at room temperature. When the reaction was completed, aluminum bromide was filtered out, benzene was distilled off, and the remaining solid was dried in vacuo at 100° C. 12.8 g of a brown, highly viscous Br-containing polycarbosilane were obtained. The elemental analysis of this material showed a content of 23.5% Si and 32.4% Br. $^1$H-NMR (ppm): 0.5 (CH$_3$); very weak signal at 7.2 (=slight residue of unexchanged phenyl groups). $^{19}$F-NMR (ppm): −126.7 to −136.3 (CF$_2$).

EXAMPLE 21

A solution of 6.3 g of the brominated polycarbosilane obtained in Example 20 in 200 ml of chloroform under a protective gas atmosphere was added dropwise at room temperature with stirring to 10 g of ammonium fluoride (previously dried in vacuo at 60° C.) and 100 ml of chloroform also under a protective gas atmosphere. After a reaction time of 2 days, 75 ml of water were added. The organic phase was then separated, filtered, the solvent was evaporated, and the remaining residue was dried in vacuo at a maximum of 80° C. Four grams of a brown, viscous fluorine-containing polycarbosilane was obtained. The elemental analysis of this material showed a content of 26.4% Si; 27.6% C; 4.8% H; 50.4% F. $^1$H-NMR (ppm): 0.5 (CH$_3$); only very weak signal at 7.2(=small content of residual phenyl groups). $^{19}$F-NMR (ppm): −128.0 to −137.0 (CF$_2$).

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A polycarbosilane composed of structural units corresponding to the formula I:

wherein

R$^1$ represents hydrogen, alkyl, cycloalkyl, aryl, arylalkyl or halogen, whereby R$^1$ may have different meanings in various units of one and the same polycarbosilane;

R$^2$ represents alkyl, cycloalkyl, aryl, arylalkyl, or halogen, whereby R$^2$ may have different meanings in various units of one and the same polycarbosilane;

R$^3$ represents fluorine or phenyl, whereby R$^3$ may have different meanings in various units of one and the same polycarbosilane;

R$^4$ represents hydrogen, fluorine, or phenyl, whereby R$^4$ may have different meanings in various units of one and the same polycarbosilane, n represents the numeral 1 if R$^3$ and/or R$^4$ represents phenyl, and n represents an integer from 1 to 6 if R$^3$ represents fluorine and R$^4$ represents hydrogen or fluorine, whereby n may have different meanings in various units of one and the same polycarbosilane, and p represents an integer from n to 2n−1, whereby p may have different meanings in various units of one and the same polycarbosilane.

2. A polycarbosilane according to claim 1, wherein the groups R$^3$ and R$^4$ and the values n and p each have only a single meaning in the structural units of formula I.

3. A polycarbosilane according to claim 1, wherein the groups R$^1$ and R$^2$ each have only a single meaning in the structural units of formula I.

4. A polycarbosilane according to claim 1, wherein R$^3$ represents phenyl, and n is 1.

5. A polycarbosilane according to claim 1, wherein R$^3$ represents fluorine, and R$^4$ represents hydrogen or fluorine.

6. A polycarbosilane according to claim 5, wherein R$^4$ represents fluorine.

7. A polycarbosilane according to claim 5, wherein n represents an integer 1 to 3.

8. A polycarbosilane according to claim 5, wherein R$^1$ represents hydrogen, lower alkyl or unsaturated lower alkyl, phenyl or halogen, and $R^2$ represents lower alkyl or unsaturated lower alkyl, phenyl or halogen.

9. A polycarbosilane according to claim 8, wherein said lower alkyl or unsaturated lower alkyl is methyl, ethyl, propyl, butyl or vinyl.

10. A polycarbosilane according to claim 5, wherein $R^2$ represents halogen.

11. A polycarbosilane according to claim 10, wherein said halogen is chlorine, bromine or fluorine.

12. A polycarbosilane according to claim 10, wherein $R^1$ also represents halogen.

13. A polycarbosilane according to claim 12, wherein said halogen is chlorine, bromine or fluorine.

14. A polycarbosilane according to claim 13, wherein $R^1$ and $R^2$ each represent fluorine.

15. A polycarbosilane according to claim 1, wherein said polycarbosilane is cross-linked by branching groups corresponding to at least one of the formulas II and III:

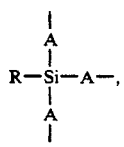
(II)

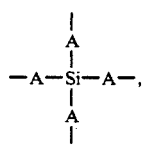
(III)

wherein

A represents a group $C_nR_p^3R_{2n-p}^4$, in which the groups $R^3$ and $R^4$ and the values n and p have the meanings given in claim 1, and R represents hydrogen, alkyl, cycloalkyl, aryl or arylalkyl.

16. A polycarbosilane according to claim 1, having halogen, alkyl, cycloalkyl, arylalkyl, aryl, alkoxy or hydroxy end groups.

17. A process for preparing a polycarbosilane composed of structural units corresponding to the formula I:

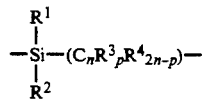
(I)

in which $R^1$ represents hydrogen, alkyl, cycloalkyl, aryl, arylalkyl or halogen, whereby $R^1$ can have different meanings in various units of one and the same polycarbosilane;

$R^2$ represents alkyl, cycloalkyl, aryl, arylalkyl or halogen, whereby $R^2$ can have different meanings in various units of one and the same polycarbosilane;

$R^3$ represents fluorine or phenyl, whereby $R^3$ can have different meanings in various units of one and the same polycarbosilane;

$R^4$ represents hydrogen, fluorine or phenyl, whereby $R^4$ can have different meanings in various units of one and the same polycarbosilane, n represents the numeral 1 if $R^3$ and/or $R^4$ represent phenyl, and n represents an integer from 1 to 6 if $R^3$ represents fluorine and $R^4$ represents hydrogen or fluorine, whereby n can have different meanings in various units of one and the same polycarbosilane, and p represents an integer from n to $2n-1$, whereby p can have different meanings in various units of one and the same polycarbosilane;

wherein for preparing a polycarbosilane composed of structural units corresponding to the formula Ia:

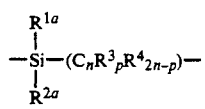
(Ia)

in which $R^{1a}$ represents hydrogen, alkyl, cycloalkyl, aryl or arylalkyl, whereby $R^{1a}$ can have the same or different meanings in various units of one and the same polycarbosilane, $R^{2a}$ represents alkyl, cycloalkyl, aryl or arylalkyl, whereby $R^{2a}$ can have the same or different meanings in various units of one and the same polycarbosilane, $R^3$, $R^4$, n and p have the meanings given above;

said process comprises the steps of: reacting a dihalosilane corresponding to the formula IV

(IV)

with a dibromide compound corresponding to the formula V

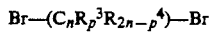
(V)

wherein

X represents the halogens chlorine, bromine or iodine, and $R^{1a}$, $R^{2a}$, $R^3$, $R^4$, n and p have the meanings given above, in a Grignard polycondensation reaction with magnesium metal.

18. A method according to claim 17, wherein X represents chlorine or bromine, and Hal represents chlorine, bromine or fluorine.

* * * * *